United States Patent [19]
Myers et al.

[11] 3,880,616
[45] Apr. 29, 1975

[54] RESPIRATORY SUPPORT SYSTEM

[75] Inventors: William P. Myers; Robert L. Johnson, both of Davenport, Iowa

[73] Assignee: The Bendix Corporation, Davenport, Iowa

[22] Filed: Nov. 19, 1973

[21] Appl. No.: 416,908

[52] U.S. Cl. .......................... 55/62; 55/162; 55/179
[51] Int. Cl. ............................................. B01d 53/04
[58] Field of Search .......... 55/25, 62, 75, 179, 389, 55/162, 76; 128/142

[56] References Cited
UNITED STATES PATENTS

| | | | |
|---|---|---|---|
| 2,944,627 | 7/1960 | Skaistrom | 55/62 |
| 3,155,471 | 11/1964 | Schykim et al. | 55/162 |
| 3,280,536 | 10/1966 | Berlin | 55/62 |
| 3,292,346 | 12/1966 | Adams | 55/33 |
| 3,313,091 | 4/1967 | Berlin | 55/62 |
| 3,534,529 | 10/1970 | Mattia | 55/62 |

*Primary Examiner*—Charles N. Hart
*Attorney, Agent, or Firm*—Leo H. McCormick, Jr.; William N. Antonis

[57] ABSTRACT

A system for isothermally separating one component from a fluid mixture to produce a breathable fluid by alternately presenting the fluid mixture to first and second beds of adsorbent material. A control valve adjacent each of the beds will admit the fluid under pressure from a compressor and a storage reservoir to rapidly build up the pressure in the selected adsorbent bed of material. The beds of adsorbent material are interconnected by a first conduit through which the fluid under pressure is communicated, a second conduit through which the product effluent flowing from the selected bed after retention of one component of the fluid mixture is communicated to the other bed for removal of the one component therefrom by flowing to the atmosphere, a third conduit for equalization of the fluid pressure in the first and second beds upon switching from one bed to the other, and a fourth conduit through which the product effluent is carried to a storage reservoir for use as a breathable fluid. A timing mechanism is connected to a manual control which automatically switches the operation of valves in the fluid mixture supply line in a first mode of operation is prevented from operating in a second mode when positive pressure breathing is desired by an operator.

11 Claims, 3 Drawing Figures

RESPIRATORY SUPPORT SYSTEM

BACKGROUND OF THE INVENTION

Moisture free oxygen or nitrogen are essential in many industrial processes such as in steel making, sewage disposal stations, etc. Many methods have been devised to produce large quantities of oxygen and nitrogen; however, these processes usually require expensive equipment and are complicated to operate. As a result both oxygen and nitrogen are usually stored under pressure in tanks. These tanks permit small users, such as hospitals, a readily available source during periods of need. Unfortunately, these tanks because of storage requirement often times become unwieldy. Some hospitals as a result have placed conduits in the walls of each room to supply patients with needed oxygen and nitrogen.

SUMMARY OF THE INVENTION

We have devised a completely portable oxygen and nitrogen separation apparatus wherein a molecular sieve material is presented with air under pressure to retain one component while allowing a breathable product effluent to be retained in a storage container.

In this separation apparatus a first container means is connected to a second container through a first conduit. The first conduit is connected to a compressor which will continually supply a reservoir and alternately supply the first and second container means with air under pressure. The molecular sieve material depending upon the pore size of the molecular structure has an affinity for either oxygen or nitrogen with the product effluent passing out an exit port of the selected container means into second conduit means, third conduit means and fourth conduit means. The second conduit means will carry a portion of the product effluent through a restriction to the other container means where the retained component is purged into the atmosphere. The third conduit means has a valve located therein to prevent free communication between the first and second containers when the air under pressure is being supplied to the molecular sieve material. The fourth conduit means carries the product effluent to the storage container for use by a patient. When the effective retention of the one component in the molecular sieve is reached, valve means connected to the first conduit will interrupt the flow of air under pressure to the one container and the product effluent to the atmosphere. At the same time the valve in the third conduit will open to equalize the pressure in the first and second containers. Thereafter, the valve means connected to the first conduit will open and allow the air under pressure in the reservoir and from the compressor to repeat the retention cycle in the other container.

At times it may be desirable for the patient to receive positive pressure breathing assistance. A manual regulator interconnected to the valve means in the first conduit and a timing control will permit the output from the compressor to be directed into an inhalator means. The inhalator means will assist the patient in breathing.

It is therefore the object of this invention to provide a system of retaining a product effluent through use of a selective adsorbent material to assist a recipient in breathing.

It is another object of this invention to provide a molecular sieve separation system with means for equalizing the pressure in a plurality of beds when the retention of one component reaches an effective level.

It is another object of this invention to provide containers in an isothermal product separation system having a plurality of conduit connections with a method of rapidly supplying fluid under pressure to the containers in a first mode of operation and equalizing the pressure in the containers in a second mode of operation.

It is still a further object of this invention to provide an isothermal separation system with a control means responsive to an operator for interrupting the separation process and supplying an inhalator means with a fluid under pressure to provide a patient with positive breathing assistance.

These and other objects will become apparent from reading this specification and viewing the drawings.

DETAILED DESCRIPTION OF THE PREFERRED EMBODIMENT

Figure 1:
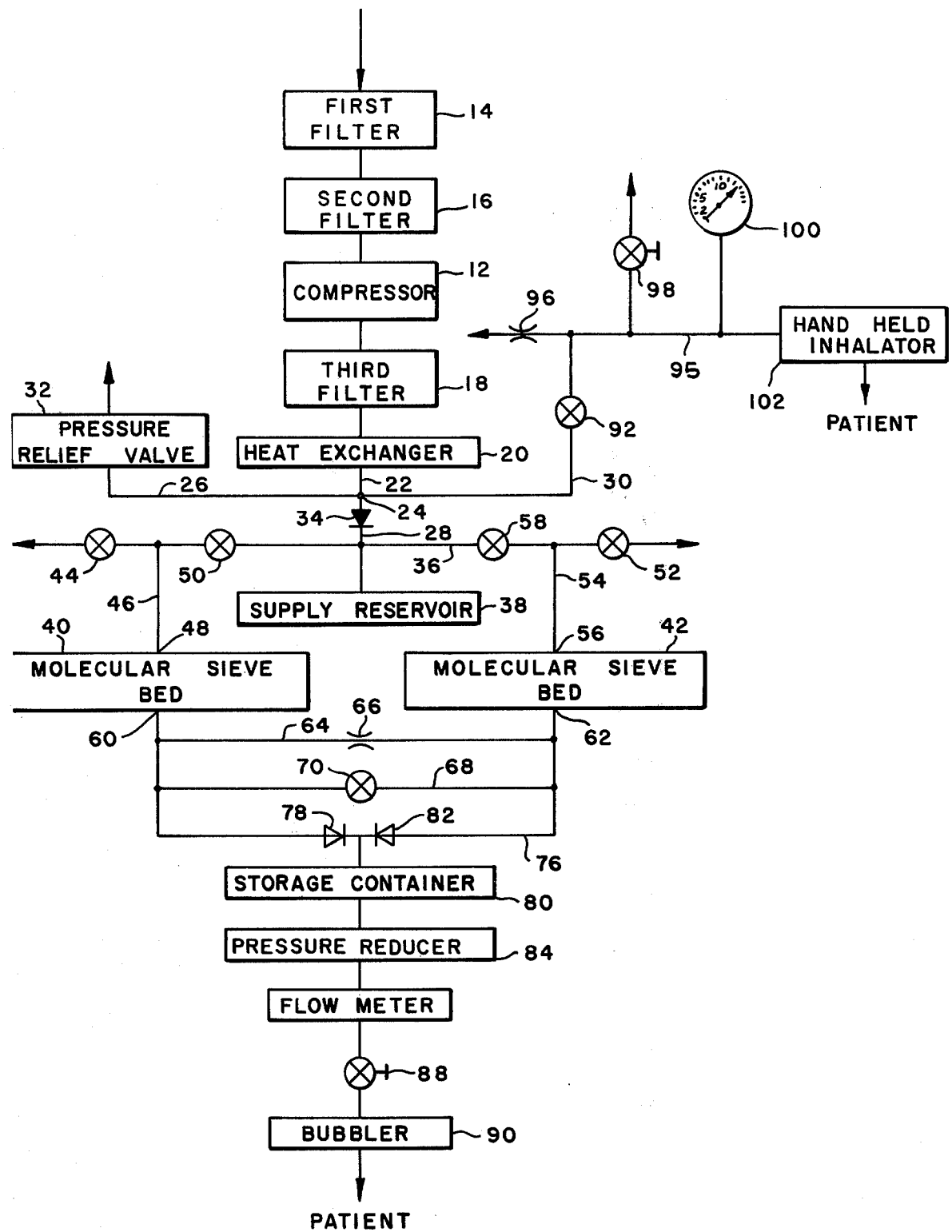
FIG. 1 is a diagrammatic illustration of a material separation system showing a method of presenting a recipient with fluid to aid in breathing.

The fluid separation system shown in FIG. 1 includes a compressor means 12 through which air from the atmosphere is drawn through a first filter means 14 wherein dust and other air borne particles are removed and a second filter 16 wherein bacterial particles which may be harmful to the health of a recipient or patient is removed. The compressor means 12 will be of the rotary vane type wherein the air is pressurized to between 10–15 psig. These vanes in this type compressor are usually made of carbon. Due to the speed that the vanes are rotated, some carbon dust will be present in the pressurized air which will necessitate locating a third filter means 18 at the exit of the compressor means 12 in order to insure a clinically pure air supply. A heat exchanger 20 is located downstream from the filter means 18 to remove any heat induced into the air supply in the compressor means 12.

The supply conduit 22 has a junction 24 which feeds into a first branch 26, a second branch 28, and a third branch 30.

The first branch 26 has a relief valve means 32 which is connected to the atmosphere. The relief valve means 32 will prevent any pressure higher than 15 psig from entering the second branch 28 or the third branch 30.

The second branch 28 has a one-way check valve 34 which prevents back flow from the supply reservoir 38 connected to the first conduit 36. The first conduit 36 connects a first container means 40 with a second container means 42. A first solenoid valve 44 connects conduit 46 coming from the first entrance port 48 with the atmosphere. A second solenoid valve 50 located in conduit 36 controls the transmission of the air under pressure to the first entrance port 48. A third solenoid valve 52 connects conduit 54 coming from the second entrance port 56 with the atmosphere while a fourth solenoid valve 58 controls the transmission of the air under pressure to the second entrance port 56.

The first container means 40 and the second container means 42 each contain a quantity of selective adsorbent material. The selective material used will normally be a natural or synthetic zeolite having a uniform pore size of 4 or 5 Angstrom units. A uniform pore size of about 4 Angstroms has been found especially suitable for concentration of nitrogen in a primary effluent product derived from atmospheric air. A molecular sieve material having a uniform pore size of about 5 Angstroms has been found to be a satisfactory adsorbent for the concentration of oxygen in the primary effluent product, as in this invention oxygen derived from atmospheric air. Each of the molecular sieve materials mentioned also exhibits an affinity for moisture, and to some extent carbon dioxide. Accordingly, the primary effluent product derived by the use of these materials from a feed stream of atmospheric air will not only be rich in either nitrogen or oxygen, according to the material used, but also will be dry.

The first container means 40 has a first exit port 60 connected to a second exit port 62 in the second container means 42 by a second conduit means 64. The second conduit means 64 has a restriction 66 to limit the flow communication of the product effluent between the first container means 40 and the second container means 42.

A third conduit means 68 also connects the first exit port 60 of the first container means 40 with the second exit port 62 of the second container means 42. A control valve means 70 located in the third conduit means 68 controls the communication of the product effluent between the first exit port 60 and the second exit port 62. The control valve 70 is tied to the timing means 72, see FIG. 2, such that when air under pressure is flowing through either valve 50 or valve 58, valve 70 will remain inoperative. However, during the shift in direction of flow of air under pressure between valve 50 and valve 58, valve 70 will be energized by a signal from timing motor 74. Upon energization of valve 70, the product effluent and air under pressure present in the first bed of the first container 40 and in the second bed of the second container 42 can freely flow through the third conduit means 68 and equalize the pressure therebetween.

A fourth conduit 76 connects the first exit port 60 through a one-way check valve 78 to a storage container 80. A portion of the product effluent emerging from the first exit 60 can flow into the storage container for later use by the patient. Similarly, the fourth conduit 76 connects the second exit port 62 through one-way check valve 82 with the storage container 80.

The storage container 80 is connected through a pressure reducer 84 to a flowmeter 86. The flowmeter can be of a type wherein the flow, as set by hand control 88, is required to move a steel ball within a tube before passing into a bubbler type humidifier 90 before delivery to the patient.

The third branch 30 has a control valve means 92 tied to the operational switch 94 of the timing means 72. The operational switch 94 upon being switched from a first mode, wherein timing motor 74 controls the flow of air from the compressor 12, to a second mode wherein the output of the compressor 12 is used to provide a positive pressure breathing assist will energize the control valve means 92. With control valve means 92 energized, air under pressure will flow into the supply conduit 95. A fixed orifice bleed valve 96 will permit that portion of the air flow under pressure from the compressor 12 in excess of the maximum air flow required by a patient when the adjustable valve 98 is closed. For any air flow below the maximum, adjustable valve 98 is opened and an indicator 100 will provide a visual display of the quantity of air under pressure flowing to air inhalator means 102. The air inhalator means 102 will normally include a vial into which a medicant is placed and atomized by the air under pressure for transmission into the lungs of the patient.

MODE OF OPERATION OF THE PREFERRED EMBODIMENT

Figure 2:
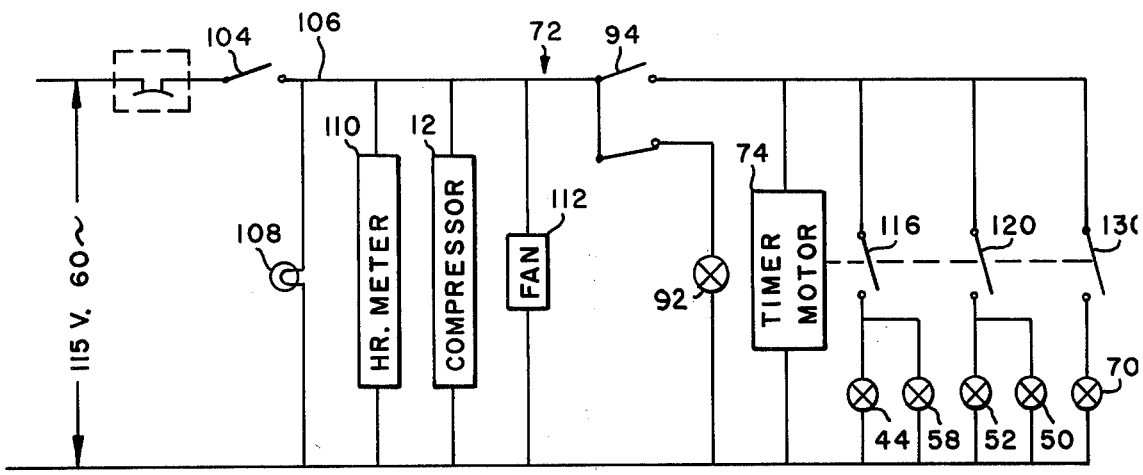
FIG. 2. is a diagrammatic illustration of the electrical connections for sequentially operating the control valves in the separation system of FIG. 1.

The breathing system derived from the fluid separation through the use of molecular sieve material shown in FIG. 1 is activated through OFF-ON switch 104, see FIG. 2, being turned on to permit electrical energy from a power source to flow in the electrical circuit 106. A light 108 will visually indicate that electrical energy is being transmitted from the source to operate an hourly operational meter 110, the compressor 12, and fan 112. The hourly meter will give the length of time the compressor 12, fan 112, and timing means 72 have been used. This will provide an operator an indication as to when the system should be inspected by the factory as to its operating parameters. Since the compressor 12 is running continually, it is necessary to have a stream of air from the fan 112 flowing over the compressor to carry the heat generated pressurizing the air to the atmosphere.

The compressor means 12 will deliver air under pressure at about 3 cfm into the supply conduit 22. With switch 94 in the position shown in FIG. 2, electrical energy will flow to the solenoid activated control valve 92. Since a patient normally will utilize between 1 - 2 cfm of air, the remaining output from the compressor means 12 is directly vented to atmosphere through the fixed orifice to valve 96. The adjustable control valve 98 will be opened to further bleed part of this 1 – 2 cfm to the atmosphere if the patient does not need to receive the remaining output from the compressor means 12. The air under pressure flowing in the supply conduit 95 will be illustrated in gage 100. Gage 100 is calibrated with the inhalator to provide the patient with positive pressure breathing assist in time of need.

When switch means 94 is changed to the other pole, electrical energy to the solenoid activated control valve 92 is terminated and timer motor 74, in addition to solenoid activated control valves 44, 50, 52, 58 and 70, will be supplied with potential electrical energy.

With solenoid control valve 92 de-energized, the entire quantity of air under pressure from the compressor 12 will flow past check valve 34 into the reservoir 38. The air pressure in reservoir 38 will follow a curve illustrated by line 114 in FIG. 3.

Solenoid activated valves 44 and 58 are tied together and are simultaneously activated by latch 116 of the timing motor 74. The timing in the opening and closing of valves 44 and 58 will follow line 118 of FIG. 3 while valves 50 and 58 will follow line 119, and valve 70 will follow line 121. With valves 44 and 58 closed, latch 120 will allow electrical energy to energize valves 50 and 52 to open the first conduit 36 to permit air under pressure to flow, as illustrated by line 122 in FIG. 3. At a set interval, such as point 124, the timing motor 74 releases latch 120 to terminate the flow of air under pressure to the first container means 40. The fluid pressure of the air in container means 40 will follow line 126 while the fluid pressure in the second container means 42 will follow line 128. The timing means 74 upon termination of the electrical energy through latch 120 will sequentially activate latch 130. With latch 130 closed, electrical energy activates valve 70 to permit equalization of the pressure in the first and second container as illustrated by portions 132 and 134 of lines 126 and 128, respectively.

During the time interval, shown by line 121, that valve 70 is activated, fluid pressure in reservoir 38 is being built up to a peak 136 as shown on line 114. At the end of this time interval, solenoid control valve 70 is de-energized and latch 116 closed to permit air under pressure to flow through now activated control valves 44 and 58. At this time the fluid under pressure in the reservoir will flow into the second container means 42 as illustrated by peak 138 and perform an additive function to the flow from the compressor 12 as shown by line 123 to rapidly build up the pressure therein.

Figure 3:
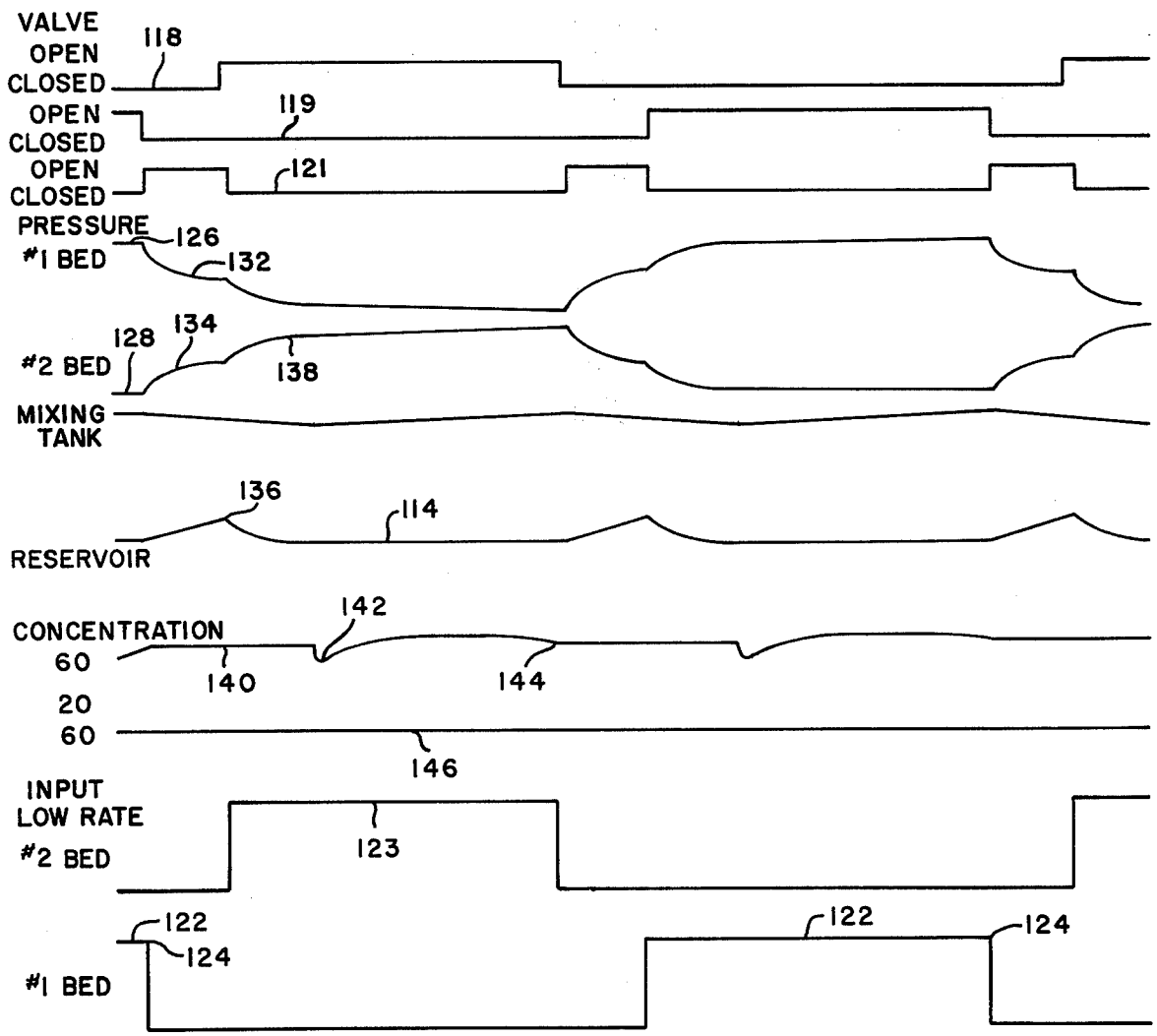
FIG. 3 is a graph showing the flow relationship in the separation system in response to the operation of the control valves located therein.

With the molecular sieve in the first and second container means 40 and 42 retaining nitrogen therein and in the timing sequence shown in FIG. 3, the concentration of oxygen in the product effluent will follow a line 140. As can be seen in the percentage of oxygen in the product effluent is about 60% during the stable portion of the cycle with low intensity 142 during the initial portion with a slight increase to point 144 as the bed passes its effective point of retention.

However, because of the size of the storage tank 80 and through the pressure reducer 84 it is possible to provide a constant concentration of oxygen which can be stabilized at about 60% as shown by line 146.

Thus, it can be seen that we have provided a system for supplying a patient with a breathable fluid derived from that atmosphere but enriched with oxygen to meet the required breathing requirements.

We claim:

1. In an isothermal process for separating a fluid mixture by selectively adsorbing one component in a first zone while desorbing the one component in a second zone, the improvement comprising:
    providing a first bed of selective adsorbent material with a first entrance port and a first exit port;
    providing a second bed of selective adsorbent material with a second entrance port and a second exit port;
    connecting the first entrance port and the second entrance port to a reservoir through a first conduit;
    connecting the first exit port to the second exit port through a second conduit, a third conduit and a fourth conduit;
    supplying said reservoir with said fluid mixture under pressure through a supply conduit;
    preventing said fluid mixture under pressure from flowing out of said reservoir through the supply conduit;
    connecting said supply conduit to a relief valve to limit pressure of said fluid mixture;
    introducing said fluid mixture in said reservoir to said first entrance port, said fluid mixture flowing through the first bed of selective adsorbent material where one component is retained while an unadsorbed product effluent is discharged through the first exit port into the second conduit, the third conduit, and the fourth conduit;
    restricting the flow of the unadsorbed product effluent through the second conduit to a fixed amount of the total volume of the unadsorbed product effluent to permit flow through the second exit into the second bed of selective adsorbent material where any of said one component retained therein is carried through the second entrance port into the atmosphere;
    preventing said unadsorbed product effluent from flowing in said third conduit while said fluid mixture is communicated to the first bed of selective adsorbent material;
    allowing the remainder of said total volume of the unadsorbed product effluent to flow through a one-way control into a storage container;
    interrupting the flow of the fluid mixture communicated to said first bed of selective adsorbent material through the first entrance port and the flow of the unadsorbed product effluent communicated through the second entrance port to the atmosphere;
    permitting the unadsorbed product effluent to freely flow through said third conduit until the pressure in the first and second beds of selective adsorbent material are substantially equal;
    allowing said fluid mixture under pressure introduced into the first conduit to be communicated through said second entrance port to the second bed of selective adsorbent material to retain said one component therein while allowing an unadsorbed product effluent to flow through the second exit port to the second conduit, the third conduit, and the fourth conduit for removing the retained one component from the first bed of selective adsorbent material and retention in said storage container; and
    cycling the fluid mixture under pressure between the second bed of selective adsorbent materials and the first bed of selective adsorbent material when the effective retention of the one component in either bed is reached.

2. The process, as recited in claim 1, wherein said cycling step further includes:
    inhibiting the flow of the fluid mixture to the first entrance and the second entrance during the time period said product effluent is flowing in the third conduit to equalize the pressure in the first and second beds of selective adsorbent material.

3. The process, as recited in claim 2, wherein said cycling step further includes:
    charging said reservoir with the fluid mixture under pressure during said inhibiting of the flow to the first and second entrances for rapidly pressurizing the adsorbent bed of material when the fluid mixture communication is re-established with the first and second beds of adsorbent material.

4. The process, as recited in claim 3, wherein said cycling step further includes:
    diverting the fluid mixture under pressure away from said reservoir to an inhalator to provide a recipient with positive pressure breathing.

5. The process, as recited in claim 4, wherein said cycling step further includes:
    providing said fluid mixture under pressure with a connection to a relief valve for limiting the pressure of that portion of the fluid mixture diverted to the inhalator.

6. A system for supplying a recipient with a breathable fluid derived by isothermally separating a fluid mixture into component parts, said system comprising:
  filter means through which said fluid mixture flows for removal of air borne contaminants which may affect the recipient;
  compressor means connected to said filter means for pressurizing the fluid mixture;
  reservoir means connected to said compressor means through a supply conduit for retaining a substantially constant supply of said fluid mixture under pressure;
  first relief valve means connected to said supply conduit for limiting the intensity of the fluid pressure supplied to the reservoir to 15 psig;
  first container means having a first entrance port and a first exit port for retaining a first quantity of a selective adsorbent material;
  second container means having a second entrance port and a second exit port for retaining a second quantity of said selective adsorbent material;
  first conduit means connecting the first and second entrances of the first and second container means to said reservoir means for alternately communicating the pressurized fluid mixture to the selective adsorbent materials contained therein;
  second conduit means connecting the first exit port with the second exit port for permitting restrictive communication therebetween;
  third conduit means connecting said first exit port with the second exit port for cyclically permitting free communication between the first and second container means;
  fourth conduit means connecting said first exit port and said second exit port to a storage container for retaining a breathable fluid; and
  control means for permitting the pressurized fluid mixture to only flow through the first entrance port into contact with the first quantity of selective adsorbent material where one component of the mixture is retained while a product effluent of breathable fluid passes through the first exit port into the second conduit, the third conduit, and the fourth conduit, said product effluent in the second conduit passing through the second exit into the second container means to remove any of said one component retained by said second quantity of selective adsorbent material by flowing through the second entrance port to the atmosphere, said product effluent of breathable fluid in the fourth conduit flowing in an output conduit to meet an operational need, said control means interrupting the flow of pressurized fluid to the first entrance and the flow of the one component and product effluent through the second entrance when the effective retention of the one component in the first bed of adsorbent material is achieved at the end of a first time period, said control means being connected to the third conduit for permitting the product effluent communicated to the third conduit to equalized the pressure in the first and second containers in a second time period, said control means directing the fluid under pressure to the reservoir during said second time period, said control means permitting said pressurized fluid mixture supplied to the reservoir in the second time period to rapidly establish the operational pressure for adsorption of the selective material during a third time period, said control means permitting the fluid under pressure to be communicated to the second entrance port of the second container means where the one component is retained while the breathable product effluent passes through the second exit port into the second conduit means, the third conduit means, and the fourth conduit means for removing the one product effluent from the first bed of selective adsorbent material in the first container means in a fourth time period to continually provide a substantially uniform concentration of said product effluent to meet said operational need.

7. The system, as recited in claim 6, wherein said control means includes:
  timing means for closing the first and second entrance ports during the interval when the product effluent is flowing in the third conduit to equalize the pressures in the first and second beds of adsorbent materials.

8. The system, as recited in claim 7, wherein said timing means includes:
  switching means for transmission of electrical energy to operate the control means in response to a first operational manual input, said switching means interrupting the transmission of electrical energy to the control means in response to a second operational manual input and transmitting an energizing signal to a positive pressure breathing inhalator.

9. The system, as recited in claim 8, wherein said system further includes:
  heat exchanger means connected to said compressor means and said first conduit means for maintaining the pressurized fluid mixture at a relatively stable temperature.

10. The system, as recited in claim 9, wherein said system further includes:
  second relief valve means connected to said heat exchanger means for limiting the intensity of the pressurized fluid transmitted from the supply conduit to the positive breathing inhalator.

11. The system, as recited in claim 10, wherein said system further includes:
  gage means connected to the positive breathing inhalator for visually monitoring the intensity of the pressurized fluid.

* * * * *